United States Patent [19]

Himuro et al.

[11] Patent Number: 4,490,739
[45] Date of Patent: Dec. 25, 1984

[54] COLOR IMAGE REPRODUCING APPARATUS

[75] Inventors: Masami Himuro; Susumu Nishigaki; Kazuhiko Terunuma, all of Tokyo, Japan

[73] Assignee: Sony Corporation, Tokyo, Japan

[21] Appl. No.: 538,777

[22] Filed: Oct. 3, 1983

Related U.S. Application Data

[63] Continuation of Ser. No. 302,707, Sep. 16, 1981, abandoned.

[30] Foreign Application Priority Data

Sep. 19, 1980 [JP] Japan ............... 55-131040

[51] Int. Cl.³ .............................................. H04N 9/22
[52] U.S. Cl. ...................................................... 358/66
[58] Field of Search .......................................... 358/66

[56] References Cited

U.S. PATENT DOCUMENTS 2,713,083  7/1955  Tomer ........................... 358/66

FOREIGN PATENT DOCUMENTS 1331937  9/1973  United Kingdom .
1491471  11/1977  United Kingdom .

Primary Examiner—Richard Murray
Attorney, Agent, or Firm—Lewis H. Eslinger; Alvin Sinderbrand

[57] ABSTRACT

A color image reproducing apparatus having particular utility as a color view finder for a color image pick-up apparatus includes a black and white cathode ray tube for producing a black and white image in response to red, green and blue primary color control signals sequentially supplied thereto; a color filter including red, green and blue horizontal color filter stripes adapted to transmit light of a red, green and blue color, respectively, and arranged vertically in the order of green, blue, red, green, red, blue and green stripes; and electronic shutter for sequentially permitting the transmission of light from the black and white image through the red, green and blue color filter stripes, corresponding to the supply of the red, green and blue primary color control signals to the cathode ray tube, to form a composite color image at a predetermined position; and an objective lens for projecting the black and white image transmitted through the electronic shutter and the color filter stripes to the predetermined position.

21 Claims, 35 Drawing Figures

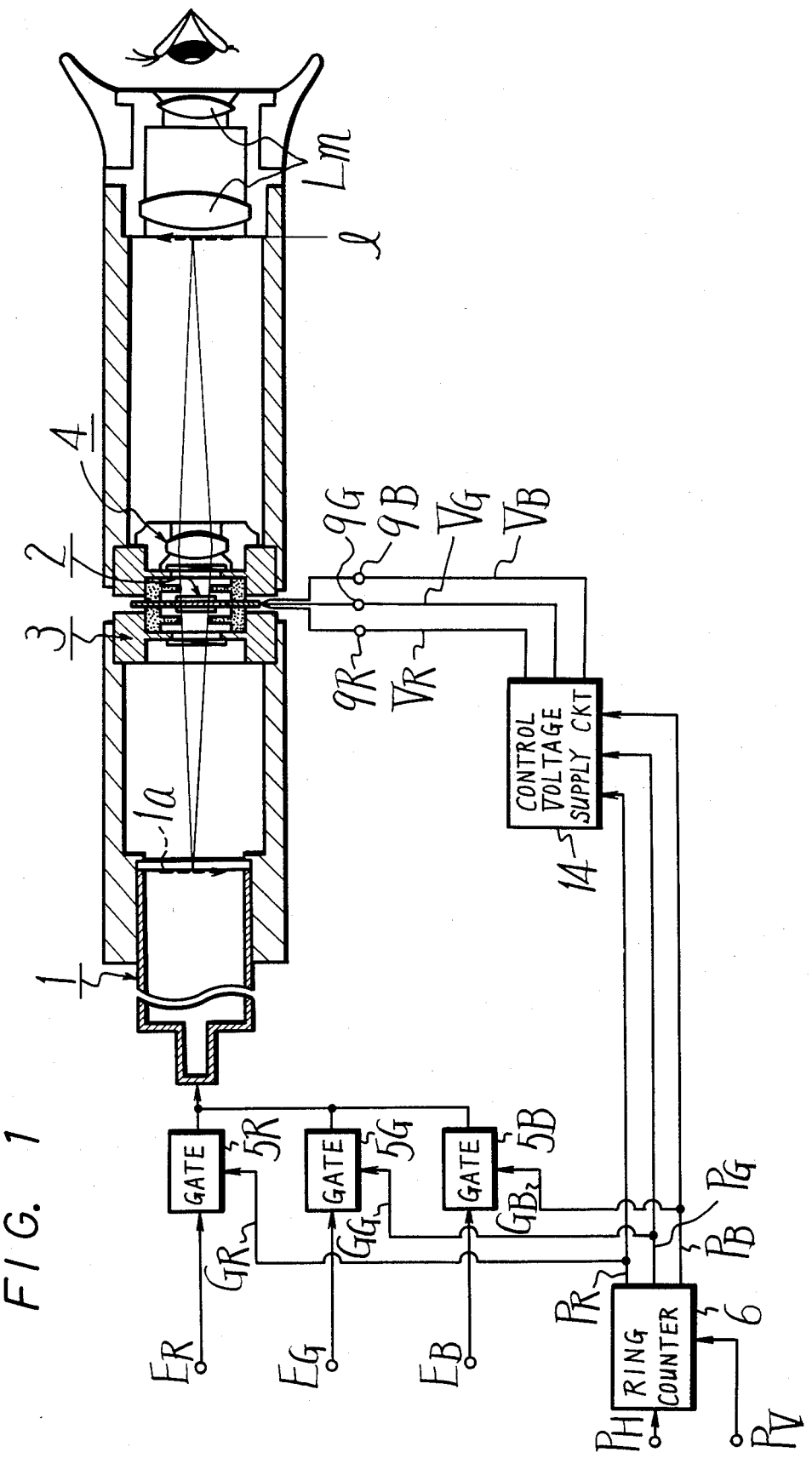

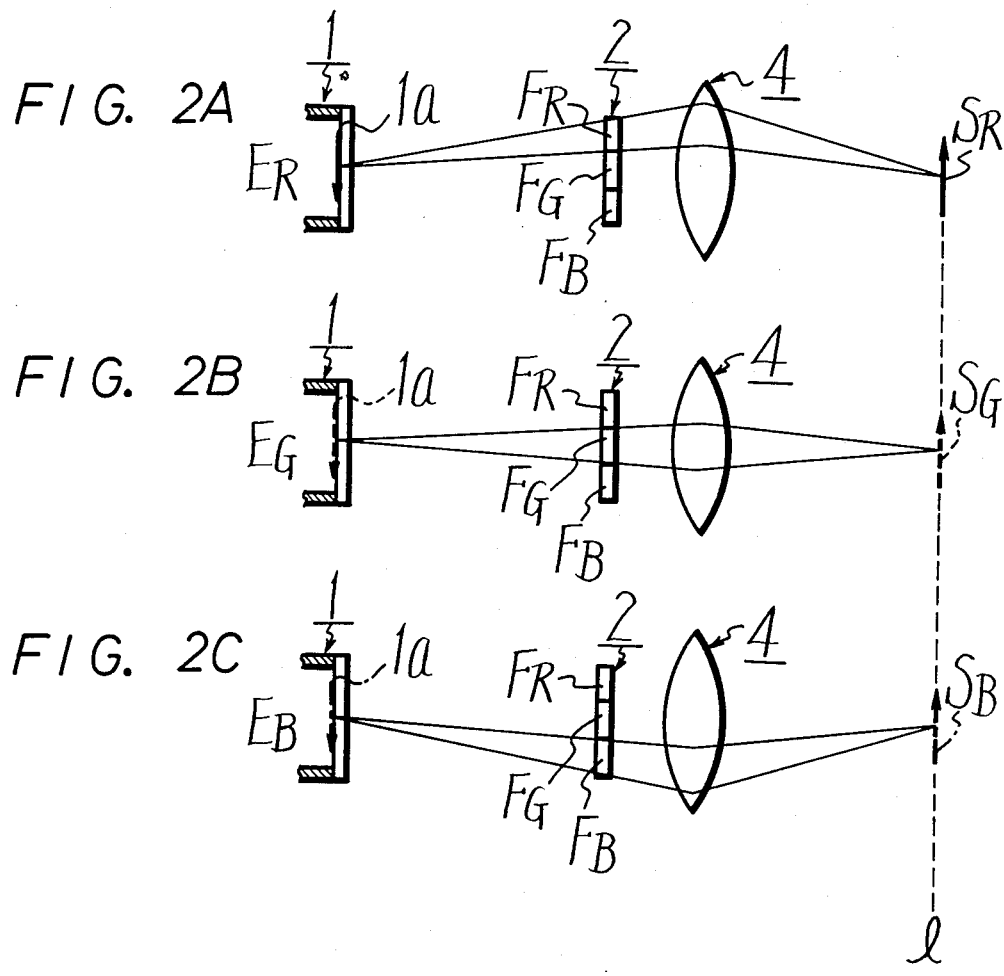
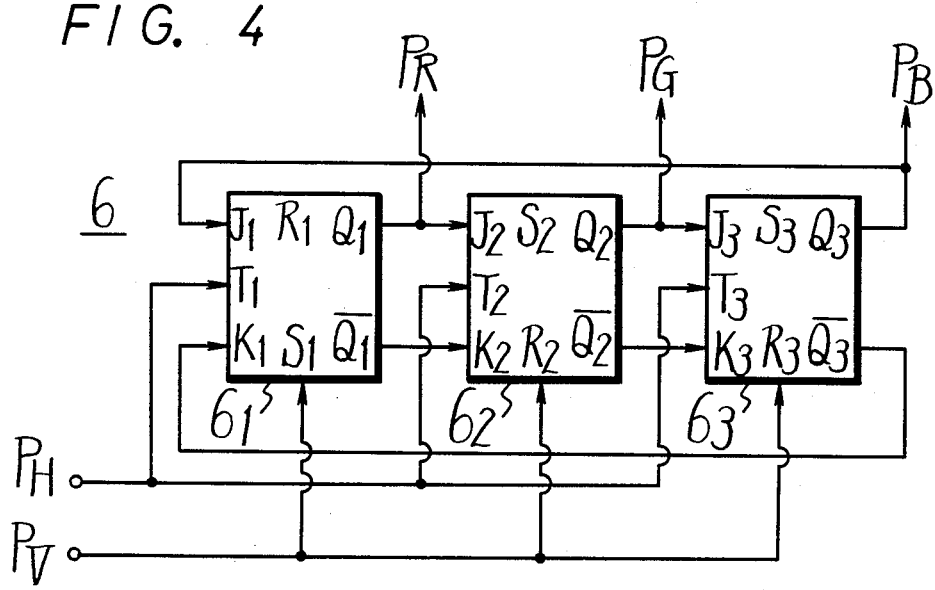

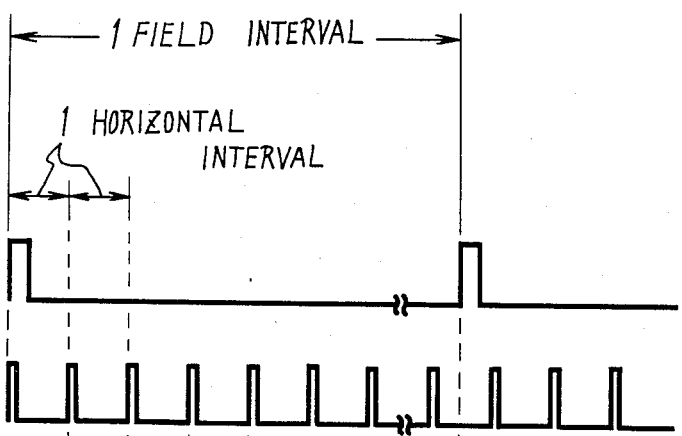
FIG. 3A(PV)
FIG. 3B(PH)
FIG. 3C(PR)
FIG. 3D(PG)
FIG. 3E(PB)
FIG. 3F(VR)
FIG. 3G(VG)
FIG. 3H(VB)

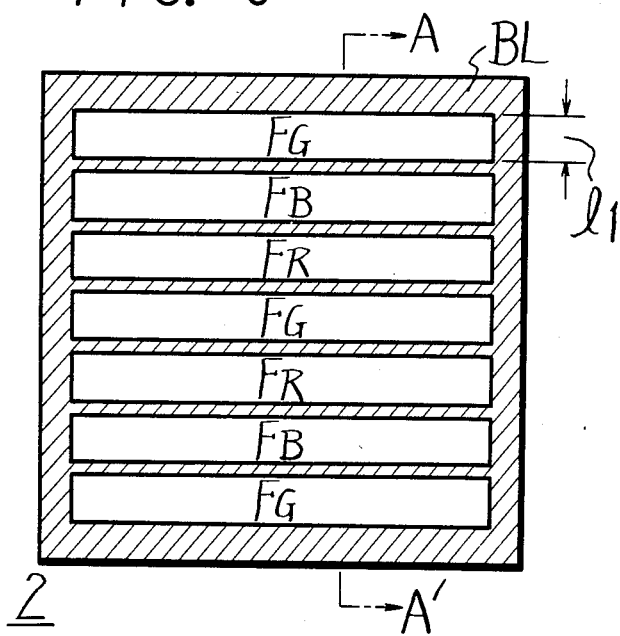
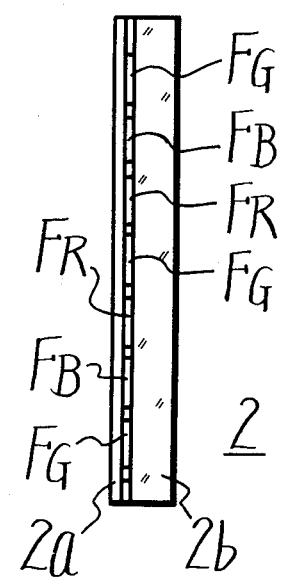
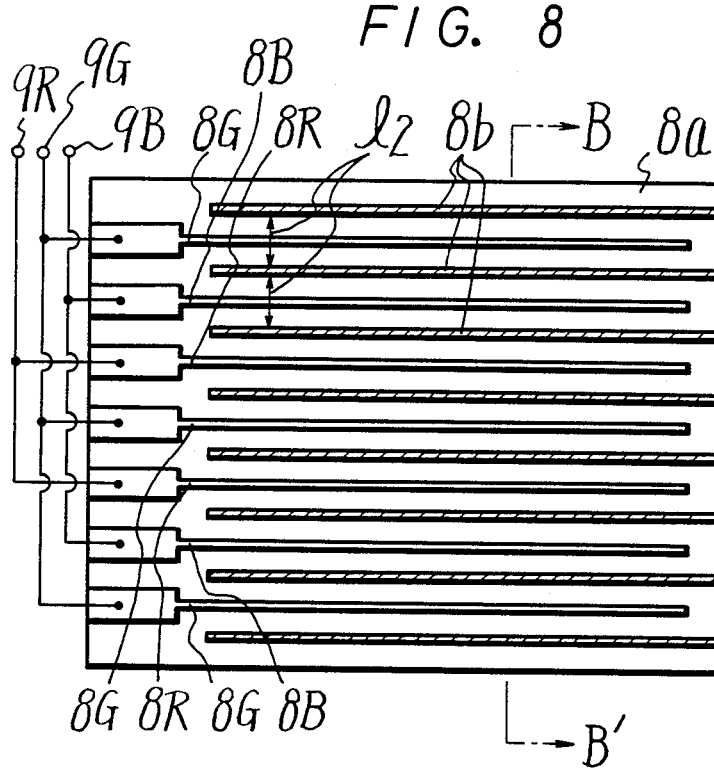
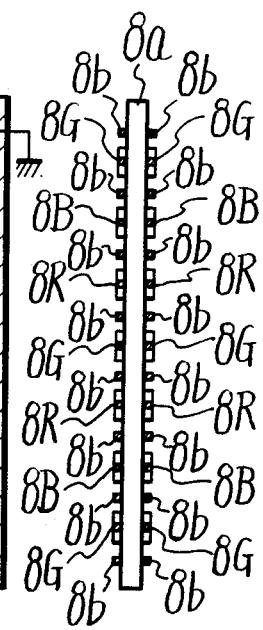

F I G. 12
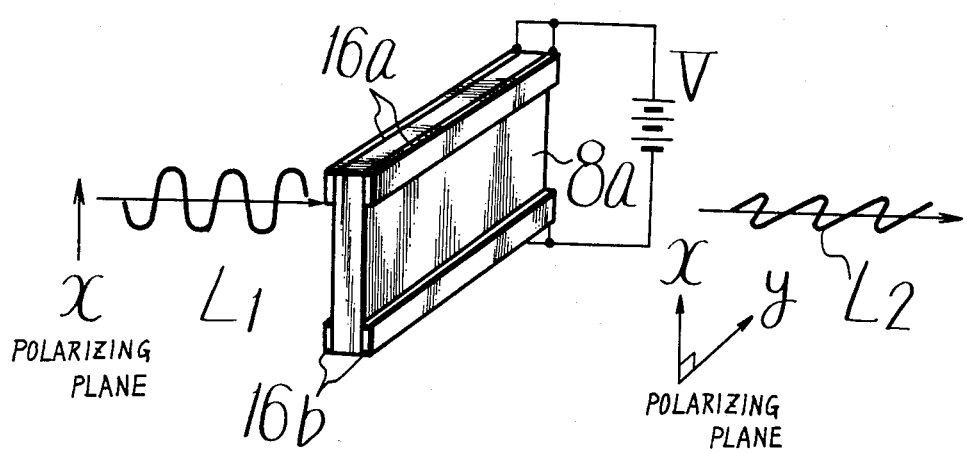
F I G. 15
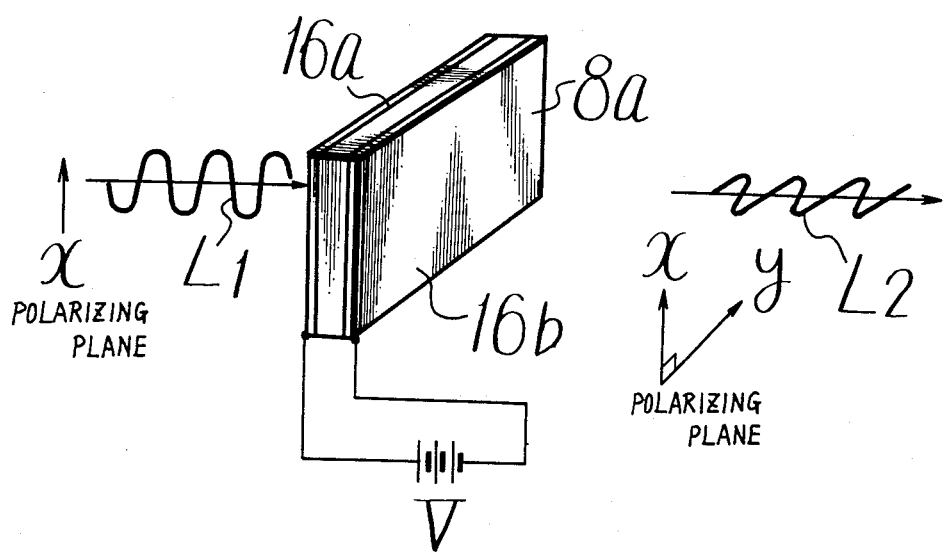

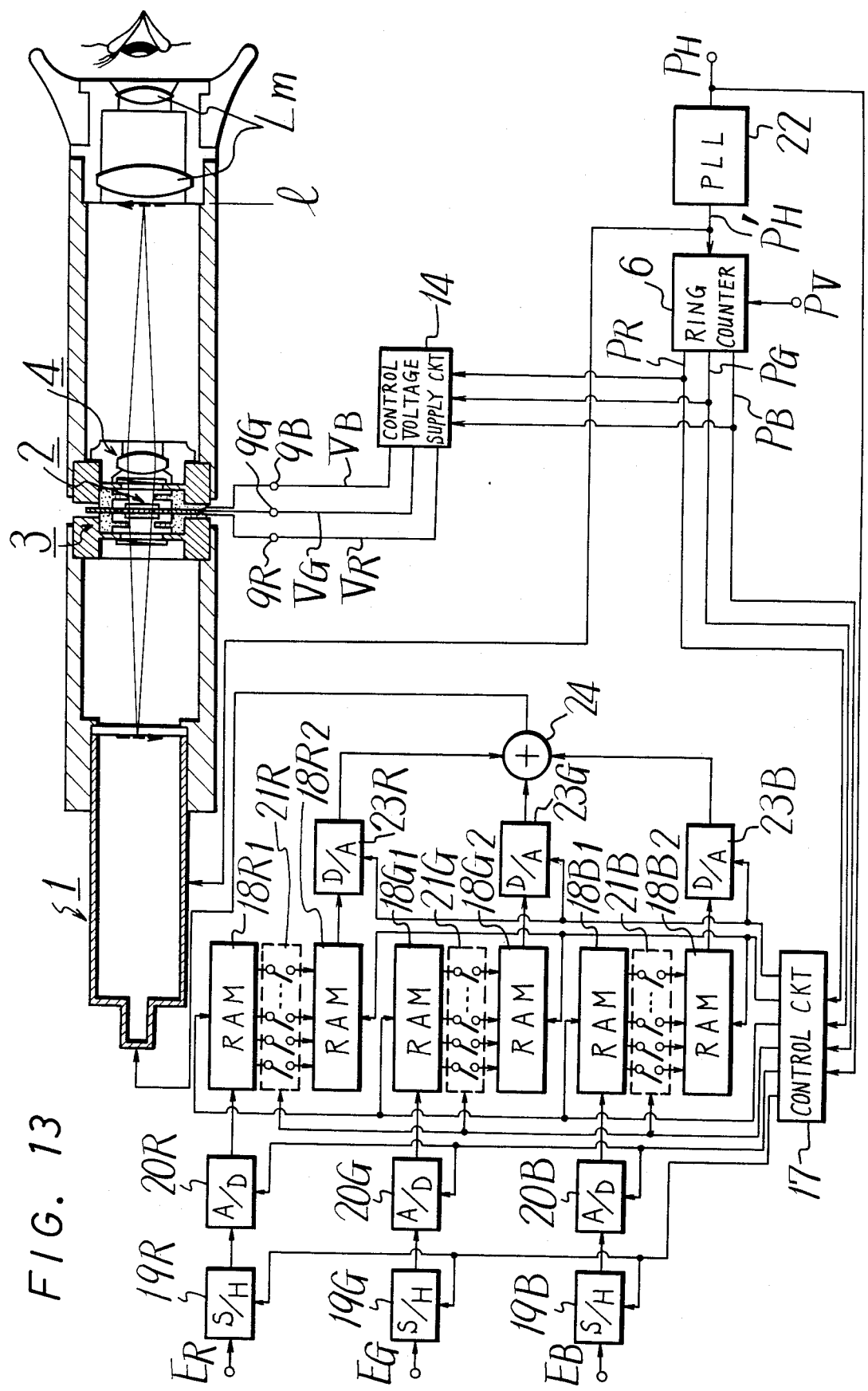

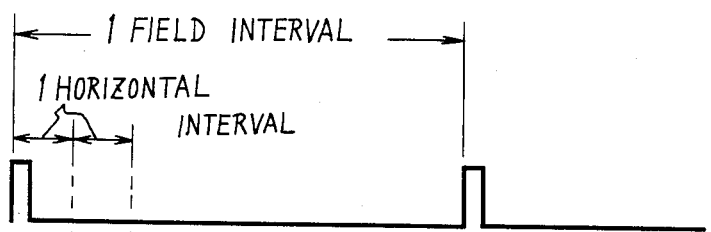
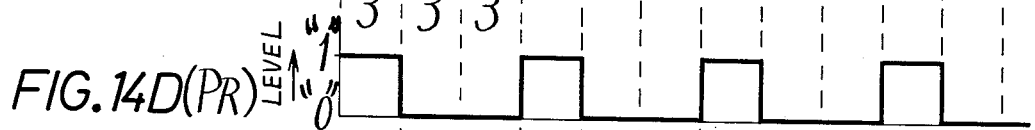
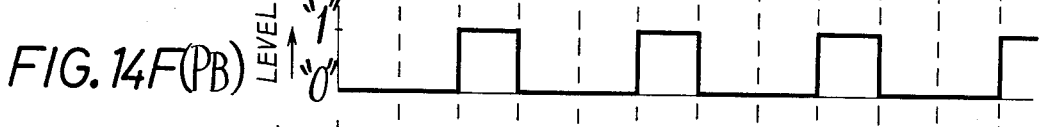
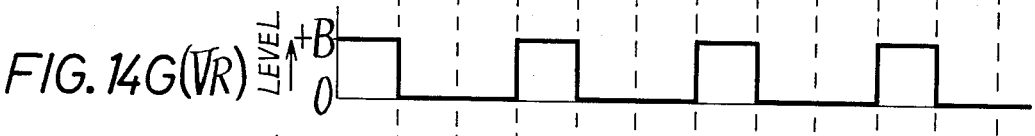

COLOR IMAGE REPRODUCING APPARATUS

This is a continuation of application Ser. No. 302,707, filed Sept. 16, 1981, now abandoned.

BACKGROUND OF THE INVENTION

1. Field of the Invention

The present invention relates generally to color image reproducing apparatus and, more particularly, is directed to a color image reproducing apparatus which is adapted to be used as a color view finder for a color image pick-up apparatus.

2. Description of the Prior Art

It has been proposed to utilize a color image reproducing apparatus of the shadow mask type as a color view finder for a color image pick-up apparatus. With this type of color image reproducing apparatus, a shadow mask type color cathode ray tube which utilizes three electron beams in provided, each beam being density modulated by the red, green and blue primary color signals, respectively, as the electron beams scan respective color phosphor elements arranged on the color phosphor screen of the cathode ray tube. However, in order for the density modulated electron beams to correctly impinge on corresponding color phosphor elements so as to prevent color misregistration or misalignment, complicated circuitry must generally be provided. For example, a convergence circuit and the like are generally provided, resulting in the circuitry having a complicated construction and being difficult to adjust.

It has also been proposed to use a color image reproducing apparatus of the beam index type in which the display screen of the cathode ray tube has periodic index stripes, in addition to the usual beam-excitable red, green and blue color phosphor stripes. The color phosphor stripes are arrayed in red, green and blue triads, repetitively across the display screen so as to be scanned by the electron beam as the latter effects a horizontal line scan in, for example, left-to-right traverse. As the electron beam scans the color phosphor stripes, it also scans the index stripes, which typically are also phosphor stripes that emit light when excited by the scanning electron beam. A photo-detector responds to each excited phosphor index stripe to produce a periodic signal, the frequency of which is equal to the frequency at which the phosphor index stripes are excited. Thus, as the electron beam scans a horizontal line across the display screen, the photo-detector generates a periodic index signal which is used to gate red, green and blue color control signals onto, for example, the first grid of the cathode ray tube in a successive sequence. Thus, the gating of the respective color control signals is desirably synchronized with the beam velocity. This means that when the beam moves into scanning alignment with, for example, a red phosphor stripe, the red control signal is gated so as to density modulate the beam with the red signal information. Then, as the beam moves into proper scanning alignment with a green phosphor stripe, the red control signal is interrupted and the green control signal is gated so as to modulate the beam. Similarly, when the beam next moves into proper scanning alignment with a blue phosphor stripe, the green control signal is interrupted and the blue control signal is gated to density modulate the beam. The foregoing gating sequence is repeated so that, as the beam scans the red, green and blue phosphor elements, it is concurrently and synchronously modulated with red, green and blue color information.

However, due to scattering of the electron beam during the scanning between adjacent index phosphor stripes and because of the time delay of the detected signals and the like, it is extremely difficult to control the electron beam to correctly impinge upon the color phosphor stripe corresponding to the density modulation of the electron beam by the respective primary color signal. Accordingly, in such case, additional circuitry is necessary to cause the electron beam to correctly impinge upon the color phosphor stripes, and the circuit construction becomes relatively complicated.

Further, with the above shadow mask type and beam index type color image reproducing apparatus, any reduction in the size of the color phosphor phosphor elements or stripes arranged on the phosphor screen is limited. In other words, when the color image reproducing apparatus of the shadow mask type or the beam index type is reduced in size, the picture elements, that is, the color phosphor elements and stripes, cannot be accurately constructed and therefore become dimensionally rough, resulting in a deterioration in the resolution of the picture. However, it is desirable that a color image reproducing apparatus, which is used as a color view finder for a color image pick-up apparatus, be of a relatively small size.

OBJECTS AND SUMMARY OF THE INVENTION

Accordingly, it is an object of this invention to provide a color image reproducing apparatus that avoids the above-described difficulties encountered with the prior art.

More particularly, it is an object of this invention to provide a color image reproducing apparatus which can be used as a color view finder for a color image pick-up apparatus.

It is another object of this invention to provide a color image reproducing apparatus which is adapted to accurately reproduce a color image with high resolution, even when the apparatus is of a relatively small size.

It is still another object of this invention to provide a color image reproducing apparatus that is simple in construction and relatively easy to manufacture and use.

In accordance with an aspect of this invention, apparatus is provided for reproducing a color image including means for producing a black and white image in response to the color video signal supplied thereto; a plurality of color filter means, each adapted to transmit light of only one color; and shutter means permitting the transmission of light from the black and white image through selected ones of the color filter means to a predetermined position in correspondence with the supply of the color video signal to the means for producing a black and white image.

The above, and other, objects, features and advantages of the present invention will become readily apparent from the following detailed description of the illustrative embodiments of the invention which is to be read in connection with the accompanying drawings.

BRIEF DESCRIPTION OF THE DRAWINGS

FIG. 1 is a partial cross-sectional view, partial block diagram, of a color image reproducing apparatus according to one embodiment of the present invention;

FIGS. 2A–2C are schematic diagrams of the lens and color filter portions of the color image reproducing apparatus of FIG. 1;

FIGS. 3A–3H are waveform diagrams used for explaining the operation of the color image reproducing apparatus of FIG. 1;

FIG. 4 is a block diagram of a ring counter that can be used in the color image reproducing apparatus of FIG. 1;

FIG. 6 is an enlarged, front plan view of the color filter of the color image reproducing apparatus of FIG. 1;

FIG. 7 is a cross-sectional view of the color filter of FIG. 6, taken along line A—A' thereof;

FIG. 8 is an enlarged, front plan view of the polarizing plane control device of the electronic shutter of FIG. 5;

FIG. 9 is a cross-sectional view of the polarizing plane control device of FIG. 8, taken along line B—B' thereof;

FIG. 12 is a schematic perspective view of one embodiment of a PLZT electro-optic element that can be utilized in the electronic shutter of FIG. 5;

FIG. 13 is a partial cross-sectional view, partial block diagram of a color image reproducing apparatus according to another embodiment of the present invention;

FIGS. 14A–14I are waveform diagrams used for explaining the operation of the color image reproducing apparatus of FIG. 13;

FIG. 15 is a schematic perspective view of another embodiment of a PLZT electro-optic element that can be used in the electronic shutter of FIG. 5;

DETAILED DESCRIPTION OF THE PREFERRED EMBODIMENTS

Figure 5:
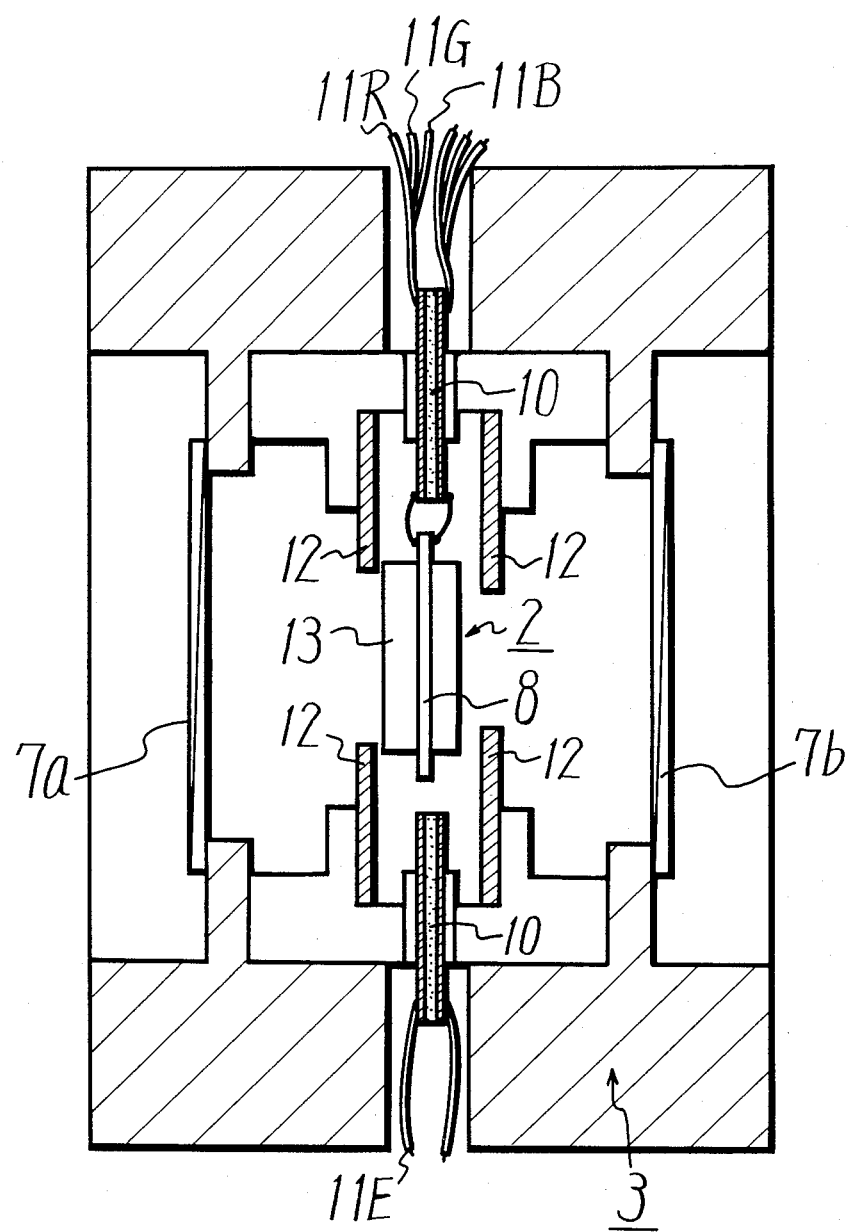
FIG. 5, is an enlarged, cross-sectional view of the color filter and electronic shutter of the color image reproducing apparatus of FIG. 1.

Referring to the drawings in detail, and initially to FIG. 1 thereof, there is shown a color image reproducing apparatus according to one embodiment of the present invention which is adapted to be used as a color view finder for a color image pick-up apparatus. As shown therein, the color image reproducing apparatus is formed principally of a black and white cathode ray tube 1, that is, one which only produces a black and white image regardless of the signals supplied thereto, a color filter 2, an electronic shutter 3 and an objective lens 4.

As shown in FIG. 1, the vertical synchronizing pulse signal $P_V$ (FIG. 3A) and the horizontal synchronizing pulse signal $P_H$ (FIG. 3B) of a color video signal are supplied to a ring counter 6 which, in turn, produces pulse signals $P_R$, $P_G$, and $P_B$, shown in FIGS. 3C, 3D and 3E, respectively, for controlling the gating of the color video signal to cathode ray tube 1 and for controlling the switching of electronic shutter 3. Ring counter 6 may be comprised of three J-K flip-flop circuits $6_1$, $6_2$, and $6_3$, as shown in FIG. 4 with each flip-flop circuit being supplied at its trigger input terminal $T_1$, $T_2$ and $T_3$, respectively, with the horizontal synchronizing pulse signal $P_H$. In addition, the set input terminal $S_1$ of flip-flop circuit $6_1$ and the reset input terminals $R_2$ and $R_3$ of flip-flop circuits $6_2$ and $6_3$, respectively, are supplied with the vertical synchronizing pulse signal $P_V$. The construction of the ring counter is usch that the $J_1$, $J_2$ and $J_3$ input terminals of flip-flop circuits $6_1$, $6_2$ and $6_3$ are respectively supplied with the outputs from output terminals $Q_3$, $Q_1$, and $Q_2$ of flip-flop circuits $6_3$, $6_1$, and $6_2$. In like manner, the $K_1$, $K_2$ and $K_3$ input terminals of flip-flop circuits $6_1$, $6_2$ and $6_3$ are respectively supplied with the inverted outputs from inverting output terminals $\overline{Q}_3$, $\overline{Q}_1$ and $\overline{Q}_2$ of flip-flop circuit $6_3$, $6_1$ and $6_2$. Pulse signals $P_R$, $P_G$ and $P_B$ and produced at output terminals $Q_1$, $Q_2$ and $Q_3$, respectively, of the flip-flop circuits.

When a vertical synchronizing pulse $P_V$ is supplied to the set input terminal $S_1$ of flip-flop circuit $6_1$ and the reset input terminals $R_2$ and $R_3$ of flip-flop circuits $6_2$ and $6_3$, pulse signals $P_R$, $P_G$ and $P_B$, at output terminals $Q_1$, $Q_2$ and $Q_3$, are set at logic levels "1" "0" and "0", respectively. Thereafter with each horizontal synchronizing pulse $P_H$ supplied to the trigger input terminals of the flip-flop circuits, the logic levels of pulse signals $P_R$, $P_G$ and $P_B$ are sequentially changed as follows: 010, 001, 100, 010 . . . In other words, pulse signals $P_R$, $P_G$, and $P_B$ are phase shifted by 120° relative to each other. However, whenever a vertical synchronizing pulse $P_V$ is supplied to the flip-flop circuits, as aforementioned, regardless of the logic level condition of the pulse signals at such time, the logic levels of pulse signals $P_R$, $P_G$, $P_B$ are again set to the condition of 100.

In the illustrated apparatus of FIG. 1, red, green and blue primary color control signals $E_R$, $E_G$ and $E_B$ are selectively applied through switching or gate circuits 5R, 5G and 5B, respectively, to a first grid of cathode ray tube 1 by which the beam current of the electron beam produced therein is controlled as the latter scans a black and white phosphor screen 1a at the front end of cathode ray tube 1 so as to produce a black and white image thereon. Each gate circuit 5R, 5G and 5B may comprise an analog gating device which is conditioned to gate, or transmit, analog singals that are applied thereto when pulse signals $P_R$, $P_G$, $P_B$, respectively, are applied in coincidence with the respective analog signal. Pulse signals $P_R$, $P_G$ and $P_B$ are phase shifted by 120° relative to each other, as previously described, so as to sequentially open the respective gate circuits to allow passage of primary color control signals $E_R$, $E_G$ and $E_B$ in sequence as the electron beam scans phosphor screen 1a, with the result that the primary color control signals are synchronously applied to cathode ray tube 1. Thus, when gate circuit 5R is enabled by pulse signal $P_R$, which is supplied thereto as a gating signal $G_R$, during one horizontal line scan interval, this gate circuit is opened so as to transmit the red primary color control, or information, signal $E_R$. The electron beam produced by cathode ray tube 1 is thereby density modulated by the red primary color control signal $E_R$. Similarly, during the next horizontal line scan interval, when gate circuit 5G is enabled by pulse signal $P_G$, which is supplied thereto as a gating signal $G_G$, this gate circuit is opened to transmit the green primary color control, or information, signal $E_G$, to cathode ray tube 1 so as to density modulate the electron beam. Finally, when gate circuit 5B is enabled by pulse signal $P_B$, which is supplied thereto as a gating signal $G_B$, during the next horizontal line scan interval, gate circuit 5B is opened to transmit the blue primary color control, or information, signal $E_B$, to density modulate the electron beam. In other words, when gating signals $G_R$, $G_G$, and $G_B$ are at logic level "1" conditions (FIGS. 3C-3E) during successive horizontal scanning intervals, the red, green and blue primary color control signals $E_R$, $E_G$ and $E_B$ are transmitted through gate circuits 5R, 5G and 5B, respectively, to density modulate the electron beam produced by cathode ray tube 1 as the beam scans phosphor screen 1a. However, since cathode ray tube 1 is only of a black and white type, the image produced by phosphor screen 1a is only a black and white image, regardless of the fact that a color video signal is supplied to cathode ray tube 1.

Color filter 2 includes at least one set of red, green and blue primary color filters $F_R$, $F_G$ and $F_B$ for transmitting therethrough light of a red, green and blue color, respectively, and is positioned in front of phosphor screen 1a of cathode ray tube 1. Electronic shutter 3 is positioned in a light transmitting or blocking relation to color filter 2 and is controlled to transmit light from the black and white image on phosphor screen 1a to selected ones of the primary color filters. In particular, electronic shutter 3 is controlled in synchronism with the switching of primary color control signals $E_R$, $E_G$ and $E_B$ so that light from the black and white image of cathode ray tube 1 is transmitted only through the red primary color filters $F_R$ of color filter 2 when primary color control signal $E_R$ is supplied to cathode ray tube 1 to density modulate the electron beam therein. In like manner, when the green primary color control signal $E_G$ is supplied to cathode ray tube 1, light from the black and white image on phosphor screen 1a is transmitted only through the green primary color filters $F_G$. Also, when the blue primary color control signal $E_B$ is supplied to cathode ray tube 1, electronic shutter 3 is controlled so that light from the black and white image on phosphor screen 1a is transmitted only through the blue primary color filters $F_R$ of color filter 2.

Objective lens 4 is provided in front of color filter 2, that is, between color filter 2 and the eye of the viewer and projects the image transmitted through color filter 2 to a predetermined position in front of objective lens 4. In particular, when the black and white image produced on phosphor screen 1a is transmitted through the red primary color filters $F_R$ of color filter 2, a red color image $S_R$ is projected by lens 4 at the predetermined position 1 as shown in FIG. 2A. In like manner, when the black and white image produced on phosphor screen 1a is transmitted through green primary color filters $F_G$ of color filter 2, a green color image $S_G$ is projected by objective lens 4 at the predetermined position 1, as shown in FIG. 2B. Also, when the blue color control signal $E_B$ is used to density modulate the electron beam of cathode ray tube 1, the black and white image produced on phosphor screen 1a is transmitted through the blue primary color filters $F_B$ of color filter 2 so that a blue color image $S_B$ is projected at the predetermined 1 by objective lens 4, as shown in FIG. 2C. It should be appreciated that the viewer thereby sees a composite color image at the predetermined position 1. This image may be viewed, for example, as shown in FIG. 1, through an eyepiece containing lenses $L_M$.

Referring now to FIG. 6. a color filter that can be used with the present invention is formed of sequentially arranged red, green and blue primary color filters $F_R$, $F_G$ and $F_B$, each having an elongated rectangular or striped configuration, with a width $l_1$ and with the lengthwise direction thereof arranged in the horizontal or traverse direction of the apparatus. It should be appreciated that each red primary color filter $F_R$ only transmits light of a red color, each green primary color filter $F_G$ only transmits light of a green color and each blue primary color filter $F_B$ only transmits light of a blue color. The portion BL of color filter 2 surrounding each primary color filter $F_R$, $F_G$ and $F_B$ is of a black color so as to provide an opaque surface through which no light can pass. Theoretically, although only one set of primary color filters $F_R$, $F_G$ and $F_B$ is sufficient for operation of the present invention, in order to reduce color shading on the image forming plane, that is, at predetermined position 1 and taking into consideration the hue and brightness of the different color images transmitted by the primary color filters, color filter 2 preferably includes horizontal or traverse primary color filter stripes arranged sequentially in the vertical direction in the order $F_G$, $F_B$, $F_R$, $F_G$, $F_R$, $F_B$ and $F_G$, as shown in FIG. 6. As shown in FIG. 7, a cover glass plate 2a and a reinforcing glass plate 2b are integrally mounted on opposing surfaces of color filter 2.

As shown in FIG. 5, electronic shutter 3 is formed of a first linear polarizing plate 7a which linearly polarizes the light passing therethrough in a first direction, and a second linear polarizing plate 7b having a polarizing plane different from that of first polarizing plate by $\pi/4$. A polarizing plane control device 8 is also mounted in front of or on cover glass plate 2a of color filter 2 and has a two-fold function, that is, to rotate the light passing therethrough by $\pi/4$ and to selectively transmit light therethrough corresponding to selected ones of the primary color filters. Preferably, polarizing plane control device 8 is constructed of an electro-optic element of PLZT $(SrBaNb_3O_6)8a$, as shown in FIG. 8.

Figure 10:
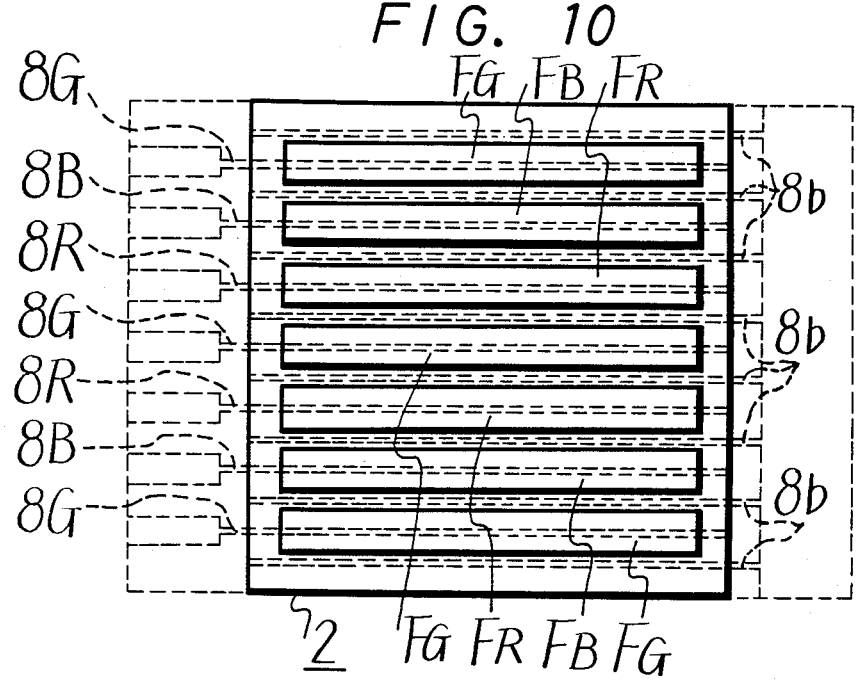
FIG. 10 is a front plan view, partially in phantom, illustrating the positional relationship between the color filter of FIG. 6 and the polarizing plane control device of FIG. 8.

In particular, polarizing plane control device 8 includes a PLZT 8a having ground electrodes 8b formed on the surface thereof, with each of the ground electrodes being constructed of thin parallel and horizontal strips of aluminum which are commonly connected at one end to a ground potential and which are separated by a distance $l_2$, which is substantially identical or slightly greater than the aforementioned width $l_1$ of each of the primary color filters $F_R$, $F_G$ and $F_B$. Control electrodes 8R, 8G and 8B are also formed on the surface of PLZT 8a and are constructed of thin parallel and horizontal strips of aluminum, each of which is positioned centrally between two adjacent ground electrodes and each of which has an end connected to a respective control voltage supply terminal 9R, 9G and 9B. Although control electrodes 8R, 8G and 8B and ground electrodes 8b are shown in FIG. 9 as being formed on both sides of PLZT 8a, it should be appreciated that such electrodes may be formed only on one side of PLZT 8a. As shown in FIG. 10, polarizing plane control device 8 is arranged in a light transmitting position superimposed over color filter 2, so that each primary color filter $F_G$, $F_B$ and $F_R$ is positioned between an adjacent pair of ground electrodes 8b of polarizing plane control device 8 and so that each control electrode 8R, 8G and 8B is positioned centrally along a respective primary color filter $F_R$, $F_G$ and $F_B$. In this manner, when a control voltage is supplied to control electrodes 8G through terminal 9G, the area of PLZT 8a between the ground electrodes 8b surrounding each control electrode 8G is rendered transparent so as to pass light through that area of PLZT 8a and therefore through primary color filters $F_G$. In this manner, only a green color image $S_G$ is formed at the predetermined position l. In like manner, when control electrodes 8B and 8R are activated, light from the black and white image is transmitted only through primary color filters $F_B$ and $F_R$, respectively.

In addition, polarizing electrodes 16a and 16b are coated on the surfaces of PLZT 8a, as shown in FIG. 12, to cause PLZT 8a to rotate the plane of polarization of light passing therethrough by $\pi/4$. Thus, when a voltage V is applied across electrodes 16a and 16b an electric field is applied to PLZT 8a, and the refractive index of the latter is varied by the Kerr effect, Pockels effect or the like. At such time, when light $L_1$ which is linearly polarized in the x-plane passes through electro-optic element 8a, the polarizing plane of the light is rotated by $\pi/4$ so that light $L_2$ which is linearly polarized in the y-plane is produced.

The arrangement of polarizing plane control device 8 and color filter 2 is shown generally in FIG. 5. In addition to the above elements, electronic shutter 3 also includes a ceramic conductive substrate 10, lead wires 11R, 11G and 11B for supplying control voltages to control electrodes 8R, 8G and 8B, respectively, through ceramic conductive substrate 10 and terminals 9R, 9G and 9B, a lead wire 11E for connecting ground electrodes 8b to a ground potential through ceramic conductive substrate 10, iris plates 12 and a reference glass plate 13.

Figure 11:
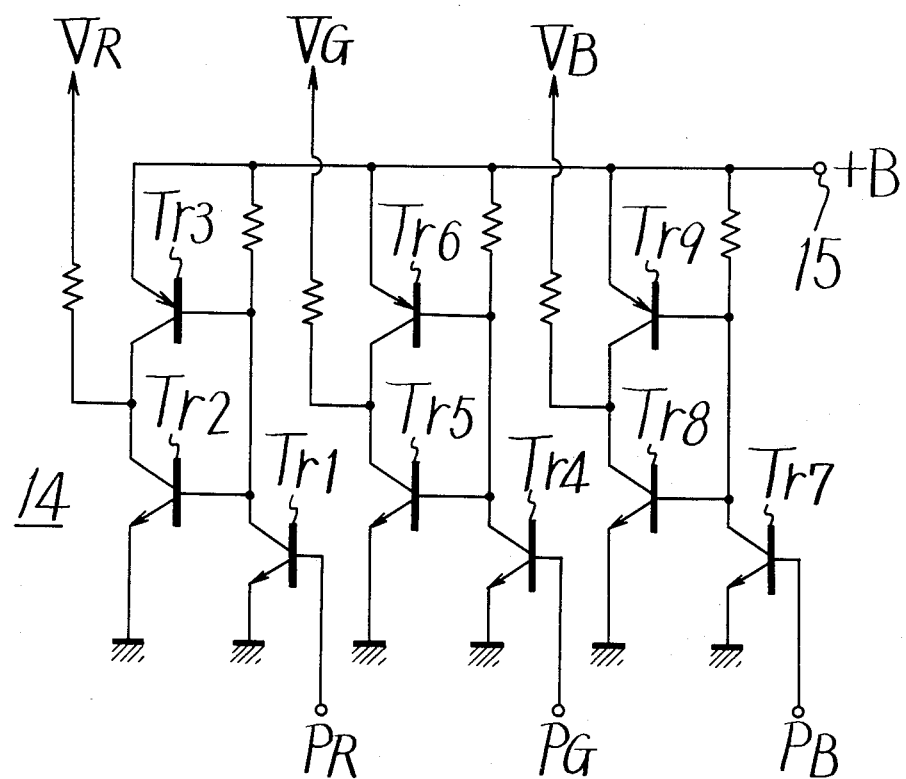
FIG. 11 is a circuit-wiring diagram of a control voltage supply circuit that can be used in the color image reproducing apparatus of FIG. 1.

Returning back to FIG. 1, control voltage supply terminals 9R, 9G and 9B, which are connected to control electrodes 8R, 8G and 8B, respectively, of polarizing plane control device 8, are supplied with control voltages $V_R$, $V_G$ and $V_B$ (FIGS. 3F, 3G and 3H) from a control voltage supply circuit 14, the control voltages being generated at a time when the respective primary color control signals $E_R$, $E_G$ and $E_B$ are supplied to black and white cathode ray tube 1. One embodiment of a control voltage supply circuit 14 that can be used in the color image reproducing apparatus of FIG. 1 is shown in FIG. 11. As shown therein, NPN transistors Tr1, Tr4 and Tr7 are respectively supplied at their bases with pulse signals $P_R$, $P_G$ and $P_B$ from the ring counter 6, and the collector-emitter path of each of the transistors is connected between a power source terminal 15 supplied with a positive DC voltage +B, and ground. Accordingly, transistor Tr1 is turned on only when pulse signal $P_R$ which is supplied to the base thereof, is at logic level "1", that is, when the red color control signal $E_R$ is supplied to cathode ray tube 1, and is turned off during all other times. Transistors Tr4 and Tr7 operate in a similar manner when supplied with pulse signals $P_G$ and $P_B$, respectively.

An NPN transistor Tr2 and a PNP transistor Tr3 have their bases commonly connected to the collector of transistor Tr1 and have their collectors commonly connected to form the output terminal at which control voltage $V_R$ is formed. In addition, the emitter of transistor Tr2 is connected to ground and the emitter of transistor Tr3 is connected to power source terminal 15. Accordingly, when transistor Tr1 is turned on, that is, when pulse signal $P_R$ is at logic level "1", the collector thereof is grounded. That means that transistor Tr2 is turned OFF and transistor Tr3 is turned ON, so that a control voltage $V_R$ equal to +B (FIG. 3F) is produced at the collector of transistor Tr3, in correspondence with the condition of pulse signal $P_R$ and is supplied to control voltage supply terminal 9R. This occurs, of course, when red color control signal $E_R$ is supplied to cathode ray tube 1. Accordingly, polarizing plane control device 8 is activated to transmit light from the black and white image on phosphor screen 1a through the red primary color filters $F_R$ to the predetermined position l. However, when transistor Tr1 is turned OFF, transistor Tr2 is turned ON to ground the collector thereof, whereby the level of control voltage $V_R$ becomes equal to zero, and no light is allowed to pass through red primary color filters $F_R$.

In like manner, an NPN transistor Tr5 and a PNP transistor Tr6, and an NPN transistor Tr8 and a PNP transistor Tr9, are similarly connected in regard to transistors Tr4 and Tr7, respectively. Accordingly, transistor Tr4 is turned ON only when pulse signal $P_G$ supplied to the base of transistor Tr4 is at its high logic level condition, that is, when green color control signal $E_G$ is supplied to cathode ray tube 1, and is turned OFF during all other times. During the former time, control voltage $V_G$ at the connection point between the collectors of transistors Tr5 and Tr6, becomes +B (FIG. 3G) and is supplied to control voltage supply terminal 9G. Further, transistor Tr7 is turned ON only when pulse signal $P_B$ supplied to the base of transistor Tr7 is at its high logic level condition, that is, when color control signal $E_B$ is supplied to cathode ray tube 1, and is turned OFF during all times. During the former time, control voltage $V_B$ at the connection point between the collectors of transistors Tr8 and Tr9, becomes equal to +B (FIG. 3H) and is supplied to control voltage supply terminal 9B.

In operation, when red color control signal $E_R$ is supplied to cathode ray tube 1, a control voltage equal to +B is supplied to control voltage supply terminal 9R. At this time, a voltage is applied between each control electrode 8R and the ground electrodes 8b surrounding each control electrode 8R. Accordingly, light is only transmitted through red primary color filters $F_R$ so that a red image $S_R$ is formed at the predetermined location l. Further, light from the black and white image formed on phosphor screen 1a is first transmitted through first polarizing plate 7a and is linearly polarized in the x-plane. Because the refractive index of PLZT 8a is varied by polarizing electrodes 16a and 16b, linearly polarized light passing through PLZT 8a and red primary color filters $F_R$ has its plane of polarization rotated by $\pi/4$ to the y-plane. Since second polarizing plate 7b only transmits light having its polarization plane in the y-direction, only red light which passes through red primary color filters $F_R$ is transmitted through second polarizing plate 7b to the predetermined position l. In like manner, when green color control signal $E_G$ is supplied to cathode ray tube 1, a control voltage equal to +B is supplied to control voltage supply terminal 9G. At this time, a voltage is applied between each control electrode 8G and the associated ground electrodes 8b. Since the refractive index of the PLZT 8a corresponding to green primary color filters $F_G$ is varied as discussed above, linearly polarized light passing through PLZT 8a and green primary color filters $F_G$ of color filter 2 is rotated by $\pi/4$. Accordingly, only green light transmitted through green primary color filters $F_G$ is transmitted to the predetermined position through second polarizing plate 7b. Further, when blue color control signal $E_B$ is supplied to cathode ray tube 1, a control voltage equal to $+B$ is supplied to control voltage supply terminal 9B. At this time, a voltage is applied between each control electrode 8B and the associated ground electrodes 8b. Since the refractive index of PLZT 8a corresponding to blue primary color filters $F_B$ is varied as discussed above, light from the black and white image on phosphor screen 1a, which is linearly polarized by first polarizing plate 7a, is passed through PLZT 8a and blue primary color filters $F_B$ of the color filter 2 and has its plane of polarization rotated by $\pi/4$. Accordingly, only blue light transmitted through blue primary color filters $F_B$ is transmitted to the predetermined position 1 through second polarizing plate 7b.

In accordance with the above, when red color control signal $E_R$ is supplied to the cathode ray tube 1 and a black and white image is produced on phosphor screen 1a thereof, light from that image is only transmitted through red primary color filters $F_R$ of color filter 2 so that only red light is projected by objective lens 4. At this time, a red color image $S_R$ is formed at the predetermined position 1 by objective lens 4. Further, when green color control signal $E_G$ is supplied to cathode ray tube 1a and a black and white image is produced on the phosphor screen 1a in response thereto, light from that image is only transmitted through green primary color filters $F_G$ of color filter 2 so that only green light is projected by objective lens 4. At this time, a green color image $S_G$ is formed at the predetermined position 1 by objective lens 4. Also, when blue color control signal $E_B$ is supplied to cathode ray tube 1 and a black and white image is produced on phosphor screen 1a in response thereto, light from that image is transmitted through blue primary color filters $F_B$ of color filter 2 so that only blue light is projected by objective lens 4. Accordingly, at this time, a blue color image $S_B$ is formed at the predetermined position 1 by objective lens 4. In other words, red, green and blue color control signals $E_R$, $E_G$ and $E_B$ are sequentially supplied to cathode ray tube 1 during successive horizontal line scan intervals to form a composite color image which can be viewed through an eyepiece.

It should be appreciated that, with the color image reproducing apparatus according to the red, green and blue color images $S_R$, $S_G$ and $S_B$ can be formed at the predetermined position in accordance with the supply of the red, green and blue color control signals $E_R$, $E_G$ and $E_B$ to cathode ray tube 1, to produce a composite color image with no color misregistration. In addition, in accordance with the above embodiment of the present invention, since a black and white cathode ray tube 1 is employed, the problem in the prior art shadow mask type and beam index type color image reproducing apparatus of reducing the size of the color phosphor elements or stripes located on a color phosphor screen is avoided. This means that the present invention is adapted to reproduce a composite color image with high resolution even when the color image reproducing apparatus is greatly reduced in size. In this manner, the present invention is particularly suitable for use as a color view finder for a color image pick-up apparatus.

It should be appreciated that although a color image reproducing apparatus of FIG. 1 has been described in which the red, green and blue color control signals $E_R$, $E_G$ and $E_B$ are sequentially supplied to cathode ray tube 1 during successive horizontal line scan intervals to sequentially form the red, green and blue color images $S_R$, $S_G$ and $S_B$ during the same horizontal line scan intervals, it may be possible to sequentially supply the red, green and blue color control signals $E_R$, $E_G$ and $E_B$ during successive field intervals to sequentially form the red, green and blue color images $S_R$, $S_G$ and $S_B$ during the same field intervals or to sequentially supply all of the red, green and blue color control signals $E_R$, $E_G$ and $E_B$ during each horizontal line scan interval to sequentially form the red, green and blue color images $S_R$, $S_G$ and $S_B$ during each horizontal line scan interval. In regard to this latter modification, a color image reproducing apparatus according to another embodiment of this invention will now be described with reference to FIG. 13, in which elements corresponding to those described above with reference to the apparatus of FIG. 1 are represented by like numerals and letters and a detailed description thereof will be omitted herein for the sake of brevity.

In the apparatus of FIG. 13, a control circuit 17 is supplied with horizontal synchronizing pulse signal $P_H$ (FIG. 14B) having a frequency $f_H$ of 15.75 KHz, and, in turn, supplies address and write-in clock signals, which are synchronized with horizontal synchronizing pulse signal $P_H$, to horizontal real time memories $18R_1$, $18G_1$ and $18B_1$, each being constructed as, for example, a random access memory (RAM). Each memory $18R_1$, $18G_1$ and $18B_1$ is adapted to store one horizontal line of video information. Accordingly, red color control signal $E_R$ is supplied to memory $18R_1$ through a sample and hold circuit 19R and an analog-to-digital converter (A/D) 20R so that the red color control signal $E_R$ corresponding to one horizontal line scan interval (1H) is written into memory $18R_1$. In like manner, green color control signal $E_G$ is supplied to memory $18G_1$ through a sample and hold circuit 19G and an A/D converter 20G so that the green color control signal $E_G$ corresponding to one horizontal line scan interval (1H) is written into memory $18G_1$. Also, the blue color control signal $E_B$ is supplied to memory $18B_1$ through a sample and hold circuit 19B and an A/D converter 20B so that the blue color control signal $E_B$ corresponding to one horizontal line scan interval (1H) is written into memory $18B_1$. It is to be noted that color control signals $E_R$, $E_G$ and $E_B$ are simultaneously supplied to memories $18R_1$, $18G_1$ and $18B_1$ during each horizontal line scan interval. Appropriate signals from control circuit 17 are also supplied to sample and hold circuits 19R, 19G and 19B and to A/D converters 20R, 20G and 20B for controlling the operations thereof.

Memories $18R_1$, $18G_1$ and $18B_1$ are connected through gate circuits 21R, 21G and 21B to horizontal real time memories $18R_2$, $18G_2$ and $18B_2$ respectively, each being constructed as, for example, a RAM. Gate circuits 21R, 21G and 21B are each supplied with gate signals from control circuit 17, which gate signals are in synchronism with horizontal synchronizing pulse signal $P_H$. Accordingly, gate circuits 21R, 21G and 21B are opened only during the period in which the gate signals are supplied thereto so as to transfer the contents previously written into memories $18R_1$, $18G_1$ and $18B_1$, respectively. Thus, the contents written into memories $18R_1$, $18G_1$ and $18B_1$, that is, each horizontal line of video information, is written into memories 18R$_2$, 18G$_2$ and 18B$_2$, respectively, at the beginning of, that is, just prior to the next horizontal line scan interval.

Horizontal synchronizing pulse signal P$_H$ is also fed to a phase locked loop (PLL) circuit 22 which, in turn, produces a pulse signal P$_H'$, as shown in FIG. 14C, which is synchronized with horizontal synchronizing pulse signal P$_H$ and has a frequency 3f$_H$ which is three times that of horizontal synchronizing phase signal P$_H$. Pulse signal P$_H'$ is supplied to trigger terminals T$_1$, T$_2$ and T$_3$ of ring counter 6, which is identical to the ring counter of FIG. 4. The vertical synchronizing pulse signal P$_V$ (FIG. 14A) is also supplied to ring counter 6. Accordingly, ring counter 6 produces pulse signals P$_R$, P$_G$ and P$_B$ which sequentially achieve a high logic level condition during one-third of each horizontal line scan interval ($\frac{1}{3}$H), as shown in FIGS. 14D, 14E and 14F, respectively. Pulse signals P$_R$, P$_G$ and P$_B$ are also fed to control circuit 17 which, in response thereto, supplies read-out clock signals to memories 18R$_2$, 18G$_2$ and 18B$_2$. In this manner, memories 18R$_2$, 18G$_2$ and 18B$_2$ sequentially read out one horizontal line of the red, green and blue color control signals, during the $\frac{1}{3}$H interval in which pulse signals P$_R$, P$_G$ and P$_B$ achieve a high logic level condition. In other words, each horizontal line of the red, green and blue color control signals is read out of RAMs 18R$_2$, 18G$_2$ and 18B$_2$ at three times the rate that it is read into RAMs 18R$_1$, 18G$_1$ and 18B$_1$, respectively. The red, green and blue color control signals E$_R$, E$_G$ and E$_B$ sequentially read out during each one-third horizontal line scan interval ($\frac{1}{3}$H) are respectively supplied through digital-to-analog (D/A) converters 23R, 23G and 23B to an adder circuit 24 where they are combined and fed as a combined signal to black and white cathode ray tube 1 for density modulating the electron beam as the latter scans phospher screen 1a. Appropriate signals from control circuit 17 are also supplied to D/A converters 23R, 23G and 23B for controlling the operations thereof. Further, pulse signal P$_H'$ from PLL circuit 22 is supplied to deflection coils of cathode ray tube 1 to control the scanning of the electron beam so that the latter performs its horizontal line scan operation at the frequency 3f$_H$ which is three times that of a conventional line scan operation.

Pulse signals P$_R$, P$_G$ and P$_B$ derived from the ring counter 6, and shown in FIGS. 14D, 14E and 14F, are also supplied to control voltage supply circuit 14 having an identical construction to circuit 14 shown in FIG. 11. Control voltage supply circuit 14 thus produces control voltages V$_R$, V$_G$ and V$_B$, shown in FIGS. 14G, 14H and 14I, respectively. These control voltages V$_R$, V$_G$ and V$_B$ are supplied to control voltage supply terminals 9R, 9G and 9B, respectively, connected to control electrodes 8R, 8G and 8B of the polarizing plane control device 8. The construction of the remaining elements shown in the apparatus of FIG. 13 are substantially identical as those shown in the apparatus of FIG. 1.

With the apparatus according to this invention, as shown in FIG. 13, during each $\frac{1}{3}$H interval in which the red color control signal E$_R$ is supplied to cathode ray tube 1, light from the black and white image formed on phosphor screen 1a is transmitted through red primary color filters F$_R$ of color filter 2 so that only light of a red color is supplied to objective lens 4. Thus, a red color image S$_R$ corresponding to one horizontal line scan interval is projected by lens 4 at the predetermined position 1. Similarly, during the $\frac{1}{3}$H interval in which the green color control signal E$_G$ is supplied to cathode ray tube 1, light from the black and white image formed on phosphor screen 1a is transmitted through green primary color filters F$_G$ of color filter 2 so that only light of a green color is supplied to objective lens 4. Thus, a green color image S$_G$ corresponding to one horizontal line scan interval is projected by lens 4 at the predetermined position 1. Further, during the $\frac{1}{3}$H interval in which the blue color control signal E$_B$ is supplied to black and white cathode ray tube 1, light from the black and white image formed on phosphor screen 1a is transmitted through blue primary color filters F$_B$ of color filter 2 so that only light of a blue color is supplied to objective lens 4, whereby a blue color image S$_B$ corresponding to one horizontal line scan interval is projected by lens 4 at the predetermined position 1. As a result, a composite color image is reproduced at the predetermined position 1.

As described above, with the apparatus of the present invention shown in FIG. 13, an effect similar to that achieved with the apparatus of FIG. 1 can be obtained. In addition, since the horizontal line scan frequency is selected as three times that of a conventional line scan frequency, the red, green and blue color control signals E$_R$, E$_G$ and E$_B$ are supplied through a time base converting circuit comprised of the above-described memories to the cathode ray tube without any video information loss. Thus, during each $\frac{1}{3}$H interval, red, green and blue primary color images S$_R$, S$_G$ and S$_B$, each corresponding of one horizontal line scan interval, are formed at the predetermined position 1, whereby a composite color image having a high resolution is reproduced.

It should be appreciated that various modifications of the above color image reproducing apparatus can be made within the scope of the present invention. For example, instead of polarizing electrodes 16a and 16b only occupying a portion of the opposite surfaces of PLZT 8a, as shown in FIG. 12, transparent electrodes 16a and 16b, each being made of nesa, may be coated on the entire opposite surfaces of PLZT 8a, as shown in FIG. 15. When a voltage V is applied between electrodes 16a and 16b of FIG. 15, light L$_1$ which is linearly polarized in the x-plane is transmitted through PLZT 8a and has its plane of polarization rotated by $\pi/4$ so as to produce light L$_2$ which is linearly polarized in the y-plane.

Figure 16:
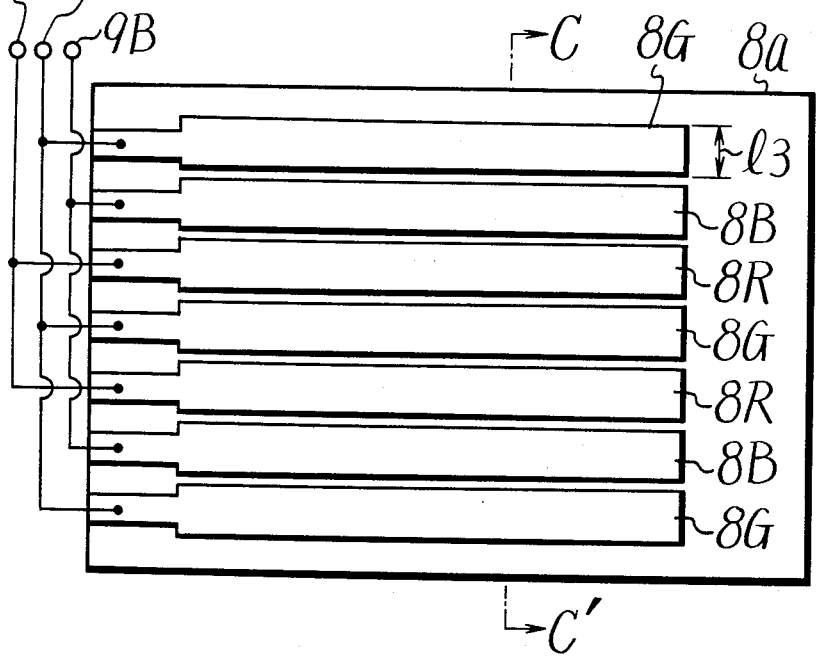
FIG. 16 is an enlarged, front plan view of another embodiment of a polarizing plane control device that can be used with the color image reproducing apparatus according to this invention.
Figure 17:
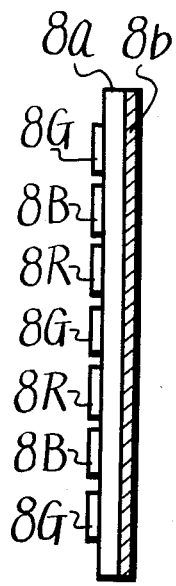
FIG. 17 is a cross-sectional view of the polarizing plane control device of FIG. 16, taken along line C—C' thereof.
Figure 18:
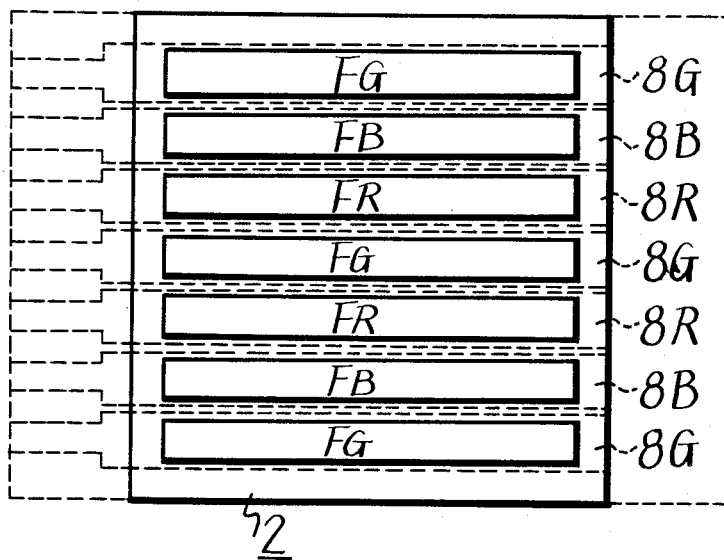
FIG. 18 is an enlarged, front plan view, partially in phantom, illustrating the position relation between the color filter of FIG. 6 and the polarizing plane control device of FIG. 16.

In conformance with polarizing electrodes 16a and 16b of FIG. 15, the polarizing plane control device 8 which forms part of electronic shutter 3 and which may be coated on color filter 2, may be formed as shown in FIGS. 16 and 17. In particular, transparent control electrodes 8R, 8G and 8B, each of which is made of, for example, nesa, and has a width l$_3$ which is a little wider than the width l$_1$ of each of the respective primary color filters F$_R$, F$_G$ and F$_B$ forming color filter 2, are positioned on one surface of PLZT 8a, and the entire opposite surface of PLZT 8a is coated with a transparent ground electrode 8b, made, for example, of nesa, as shown in FIG. 17. When polarizing plane control device 8 is coated on color filter 2, the positional relation therebetween becomes as shown in FIG. 18. It is to be appreciated that this relation or arrangement is similar to that shown in FIG. 10. In any event, the operation of polarizing plane control device 8, shown in FIGS. 16 and 17, is substantially identical to that shown in FIGS. 8 and 9.

Further, if it is only desired to form a black and white image at the predetermined position 1, the predetermined voltage +B from terminal 15 is commonly and simultaneously supplied to control voltage supply terminals 9R, 9G and 9B which are connected to control electrodes 8R, 8G and 8B, respectively, of polarizing plane control device 8 of electronic shutter 3. Since primary color filters $F_R$, $F_G$ and $F_B$ forming color filter 2 are all in an open or light transmitting state, light from the black and white images formed on phosphor screen 1a in response to the red, green and blue color control signals $E_R$, $E_G$ and $E_B$ is transmitted through all of the primary color filters $F_R$, $F_G$ and $F_B$ to objective lens 4. Accordingly, black and white images corresponding to the supply of red, green and blue color control signals $E_R$, $E_G$ and $E_B$ to cathode ray tube 1 are sequentially formed as the predetermined position 1, so that a composite black and white image is reproduced at the predetermined position 1.

In the above embodiments of the invention, although color filter 2 is located to the left of objective lens 4, as shown in FIGS. 1, 2 and 13, the positional relation therebetween may be reversed. In other words, it is only necessary that the position of color filter 2 is selected so that an image of color filter 2 itself is not formed by objective lens 4 at the predetermined position 1. Further, in the above embodiments of the invention, although color filter 2 is constructed of transverse or horizontal primary color filter stripes, color filter 2 according to the present invention is not so limited. For example, color filter 2 may be constructed of longitudinal or vertical primary color filter stripes or of coaxial primary color filter elements. In such case, electrodes 8b, 8R, 8G and 8B located on PLZT 8a are varied in configuration and position in correspondence therewith. Further, in the above embodiments of the present invention, although polarization plane control device 8 has been formed with a PLZT 8a, other electro-optic elements, such as a KDP, DKDP and the like can be substituted for PLZT 8a. Also, in the above description, although the color image reproducing apparatus according to the present invention has been described as being used as a view finder for a color image pick-up apparatus, the color image reproducing apparatus according to this invention can, of course, be applied to other uses, such as for a television receiver and the like, with the same results.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. Apparatus for reproducing a color image comprising:
   means for producing a black and white image in response to a color video signal supplied thereto;
   a plurality of color filter means, each adapted to transmit light of only one color; and
   shutter means which is stationary with respect to said plurality of color filter means for permitting the transmission of light from said black and white image only through selected ones of said color filter means to a predetermined position in correspondence with the supply of said color video signal to said means for producing a black and white image.

2. Apparatus according to claim 1; in which said plurality of color filter means includes at least one set of three primary color filters, each of the three primary color filters of each set being adapted to transmit light of a different primary color.

3. Apparatus according to claim 2; in which each set of three primary color filters includes a red, green and blue primary color filter adapted to transmit light of only a red, green and blue color, respectively.

4. Apparatus according to claim 1; in which said plurality of color filter means includes red, green and blue primary color filter stripes adapted to transmit light of only a red, green and blue color, respectively.

5. Apparatus according to claim 4; in which each of said stripes is arranged in a substantially horizontal direction and said stripes are positioned in the vertical direction in the order of a green, blue, red, green, red, blue and green primary color filter stripe.

6. Apparatus according to claim 1; in which said means for producing a black and white image includes a cathode ray tube which generates an electron beam and which has a phosphor screen on which said black and white image is produced as the phosphor screen is scanned by said electron beam.

7. Apparatus according to claim 6; in which said color video signal includes three primary color control signals sequentially supplied to said cathode ray tube to modulate the electron beam as the latter scans the phosphor screen.

8. Apparatus according to claim 7; in which said color video signal includes red, green and blue primary color control signals, each sequentially supplied to said cathode ray tube during successive horizontal line scan intervals to modulate the electron beam as the latter scans the phosphor screen.

9. Apparatus according to claim 7; further including gating means for sequentially gating said three primary color control signals to said cathode ray tube and control means for controlling said gating means to sequentially gate said three primary color control signals to said cathode ray tube.

10. Apparatus according to claim 9; in which said color video signal includes a horizontal synchronizing signal and a vertical synchronizing signal, said control means sequentially generates three primary color gating signals in response to said horizontal synchronizing signal and said vertical synchronizing signal, and said gating means includes three gating circuits for gating said three primary color control signals to said cathode ray tube in response to said three primary color gating signals, respectively.

11. Apparatus according to claim 1; in which said shutter means includes electro-optic means positioned in a light transmitting relation with said plurality of color filter means so as to permit the transmission of light from said black and white image through selected ones of said color filter means to said predetermined position in correspondence with the supply of said color video signal to said means for producing a black and white image.

12. Apparatus for reproducing a color image, comprising:
   means for producing a black and white image in response to a color video signal supplied thereto, said means for producing a black and white image including a cathode ray tube which generates an electron beam and which has a phosphor screen on which said black and white image is produced as the phosphor screen is scanned by said electron beam, and said color video signal including a horizontal synchronizing signal, a vertical synchronizing signal and three primary color control signals sequentially supplied to said cathode ray tube to modulate the electron beam as the latter scans the phosphor screen;

gating means for sequentially gating said three primary color control signals to said cathode ray tube;

control means for controlling said gating means to sequentially gate said three primary color control signals to said cathode ray tube, said control means including counter means for sequentially generating three primary color gating signals in response to said horizontal synchronizing signal and said vertical synchronizing signal, and a control circuit for generating control signals in response to said three primary color gating signals;

said gating means includes memory means for storing said three primary color control signals at a first rate and for sequentially supplying said three primary color control signals to said cathode ray tube at a second, faster rate in response to said control signals;

a plurality of color filter means, each adapted to transmit light of only one color; and shutter means for permitting the transmission of light from said black and white image through selected ones of said color filter means to a predetermined position in correspondence with the supply of said color video signal to said means for producing a black and white image.

13. Apparatus according to claim 12; in which said memory means includes first, second and third memory means for simultaneously storing said three primary color control signals, respectively, at said first rate in response to said control signals; switching means for simultaneously reading out said stored primary color control signals from said first, second and third memory means in response to said control signals; and fourth, fifth and sixth memory means for simultaneously storing said three primary color control signals, respectively, read out by said switching means and for sequentially supplying said three primary color control signals respectively stored therein to said cathode ray tube at said second, faster rate in response to said control signals.

14. Apparatus according to claim 13; in which said gating means includes first, second and third sample and hold means for sampling said three primary color control signals, respectively, in response to said control signals; first, second and third analog-to-digital converter means for converting said sampled three primary color control signals from said first, second and third sample and hold means, respectively, into digital form and for supplying said converted three primary color control signals to said first, second, and third memory means, respectively, at said first rate in response to said control signals; and first, second and third digital-to-analog converter means for converting into analog form and sequentially supplying said three primary color control signals respectively stored in said fourth, fifth and sixth memory means to said cathode ray tube at said second, faster rate in response to said control signals.

15. Apparatus according to claim 12; in which said control means includes phase locked loop means supplied with said horizontal synchronizing signal for producing a pulse signal having a frequency three times that of said horizontal synchronizing signal and for supplying said pulse signal to said counter means which sequentially generates said three primary color gating signals in response to said pulse signal and said vertical synchronizing signal, wherein said first rate corresponds to the frequency of said horizontal synchronizing signal and said second, faster rate corresponds to the frequency of said pulse signal.

16. Apparatus for reproducing a color image, comprising:

means for producing a black and white image in response to a color video signal supplied thereto, said means for producing a black and white image including a cathode ray tube which generates an electron beam and which has a phosphor screen on which said black and white image is produced as the phosphor screen is scanned by said electron beam, and said color video signal including a horizontal synchronizing signal and three primary color control signals sequentially supplied to said cathode ray tube to modulate the electron beam as the latter scans the phosphor screen;

gating means for sequentially gating said three primary color control signals to said cathode ray tube;

control means for controlling said gating means to sequentially gate said three primary color control signals to said cathode ray tube, said control means including a ring counter comprised of first, second and third flip-flop circuits, each having a trigger terminal, an input and an output, the outputs of said first, second and third flip-flop circuits being connected to the inputs of said second, third and first flip-flop circuits, respectively, and the trigger terminals of said first, second and third flip-flop circuits being supplied with said horizontal synchronizing signal;

a plurality of color filter means, each adapted to transmit light of only one color; and shutter means for permitting the transmission of light from said black and white image through selected ones of said color filter means to a predetermined position in correspondence with the supply of said color video signal to said means for producing a black and white image.

17. Apparatus for producing a color image, comprising:

means for producing a black and white image in response to a color video signal supplied thereto, said color video signal including a horizontal synchronizing signal;

control voltage supply means for sequentially generating three primary color control voltages in response to said horizontal synchronizing signal;

a plurality of color filter means, each adapted to transmit light of only one color, said plurality of color filter means including at least one set of first, second and third primary color filters, each of the first, second and third primary color filters of each set being adapted to transmit light of a different primary color; and shutter means for permitting the transmission of light from said black and white image through selected ones of said color filter means to a predetermined position in correspondence with the supply of said color video signal to said means for producing a black and white image, said shutter means including electro-optic means positioned in a light transmitting relation with said plurality of color filter means so as to permit the transmission of light from said black and white image through selected ones of said color filter means to said predetermined position in correspondence with the supply of said color video signal to said means for producing a black and white image, said electro-optic means including at least one ground electrode means and at least one control electrode means, each of the latter being positioned with respect to one of said color filters and supplied with the primary color control voltage corresponding to the respective one of said color filters so as to transmit light from said black and white image sequentially through said first, second and third primary color filters to a predetermined position.

18. Apparatus according to claim 17; in which said shutter means includes first polarizing means for linearly polarizing light from said black and white image in a first plane and second polarizing means for transmitting linearly polarized light in a second plane which is rotated by $\pi/4$ with respect to said first plane; and said electro-optic means includes polarizing electrode means for causing said electro-optic means to rotate the plane of linearly polarized light passing through said electro-optic means by $\pi/4$.

19. Apparatus for reproducing a color image, comprising:
    means for producing a black and white image in response to a color video signal supplied thereto;
    a plurality of color filter means, each adapted to transmit light of only one color;
    shutter means for permitting the transmission of light from said black and white image through selected ones of said color filter means to a predetermined position in correspondence with the supply of said color video signal to said means for producing a black and white image; and
    lens means for projecting light from said black and white image which passes through at least one of said color filter means and said shutter means to said predetermined position.

20. Apparatus according to claim 19; in which said plurality of color filter means are positioned so that an image thereof is not projected by said lens at said predetermined position.

21. Apparatus for reproducing a color image comprising:
    cathode ray tube means for producing a black and white image in response to red, green and blue primary color control signals sequentially supplied thereto;
    color filter means including at least one set of red, green and blue primary color filters adapted to transmit light of a red, green and blue primary color, respectively;
    shutter means which is stationary with respect to said color filter means for sequentially permitting the transmission of light from said black and white image through said red, green and blue primary color filters to a predetermined position in response to the supply of said red, green and blue primary color control signals, respectively, to said cathode ray tube means; and
    lens means for projecting light from said black and white image which passes through said color filter means and said shutter means to said predetermined position.

* * * * *